United States Patent [19]

Eastridge

[11] 4,089,538
[45] May 16, 1978

[54] LOWERABLE STEP ASSEMBLY FOR INTERIOR SIDE OF HINGED DOORS

[76] Inventor: Floyd W. Eastridge, 3514 Stuart Blvd., Council Bluffs, Iowa 51501

[21] Appl. No.: 788,525

[22] Filed: Apr. 18, 1977

[51] Int. Cl. .................................................. B60r 3/02
[52] U.S. Cl. ...................................... 280/166; 182/77
[58] Field of Search .................. 280/166, 164; 182/78, 182/79, 90

[56] References Cited

U.S. PATENT DOCUMENTS

| | | | |
|---|---|---|---|
| 2,324,507 | 7/1943 | Johnson | 280/166 |
| 2,581,488 | 1/1952 | Keltner | 182/77 |
| 3,136,386 | 6/1964 | Horvath | 182/77 |

*Primary Examiner*—Robert R. Song
*Attorney, Agent, or Firm*—George R. Nimmer

[57] ABSTRACT

Disclosed are lowerable step assemblies as an accessory confined between the upright hinged-edge and free-edge of a door, and especially adapted for a motor vehicle door. The step assembly includes a step-on tread pivotably associated with the lower portion of a vertical rail guided by a track means aptly mounted at the door interior side, has an operative lower-station wherein the tread is horizontal and located in elevation between the opened door bottom-edge and an underlying substrate, and also has a stowed upper-station wherein the pivotal tread has automatically assumed vertical and parallel relationship to the closed door above the bottom-edge. Other especially noteworthy features include handle means for raising the assembly from lower-station to upper-station, releaseable holding means for maintaining the rail and tread at upper-station until released for gravitational attainment of lower-station, upperstop means for determining the tread elevation at lower-station, specially combined rails and tracks therefor, and sophisticated mounting means to facilitate installation onto the door style encountered.

10 Claims, 7 Drawing Figures

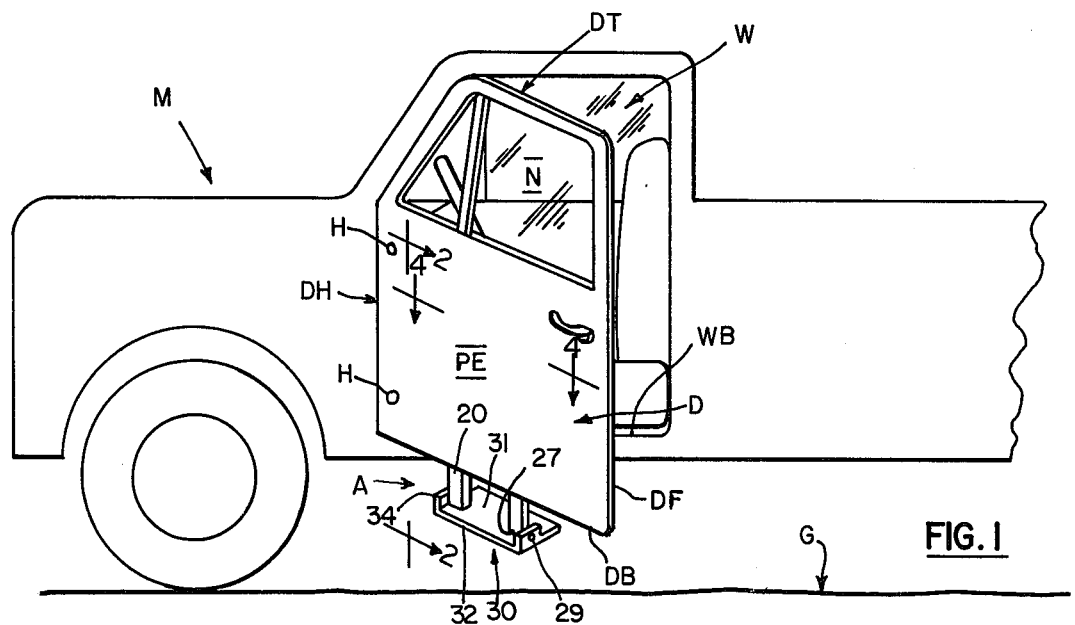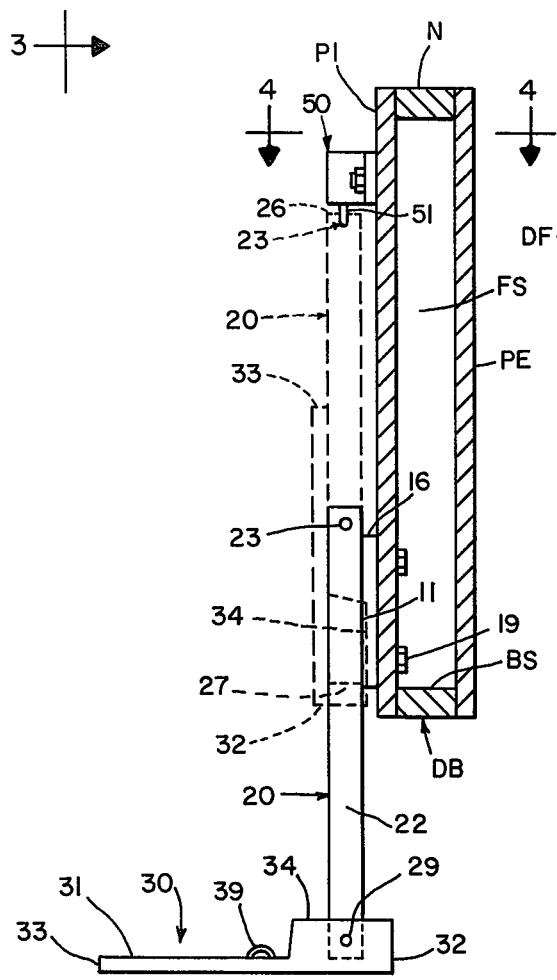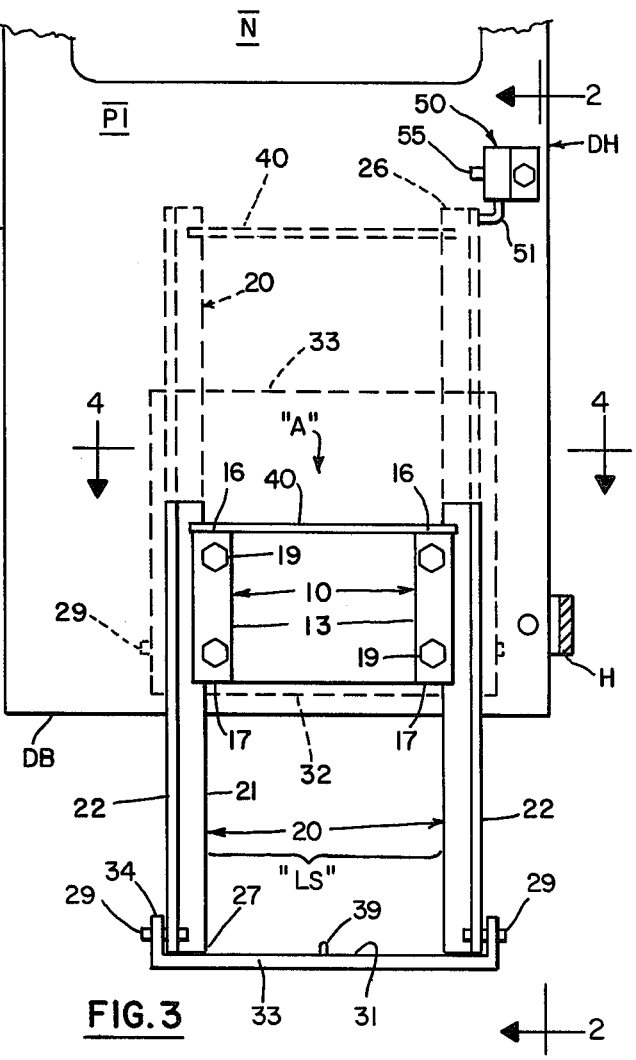

LOWERABLE STEP ASSEMBLY FOR INTERIOR SIDE OF HINGED DOORS

Doorways are oftentimes provided with a pivotal door closure having two upright edges including a free-edge and a hinged-edge. The doorway horizontal base sill is usually elevated some distance whereby personnel ingress/egress to the subjacent horizontal substrate is difficult. For example, in the case of the operator's cab for a truck motor vehicle, the cab doorway sill might be located two-feet or more distance above the roadway substrate whereby passenger alighting from the cab is very difficult, and especially for short-legged persons and for females attired in tight skirts.

Being mindful of the ingress/egress problems attendant with doorway base sills located loftily above the subjacent substrate, prior art workers have developed various step assemblies as an addendum accessory for installation in the immediate vicinity. Several such prior art step assemblies are of the lowerable type including an inoperative stored upper-station and an operative lower-station whereat the step-on tread has become temporarily lowered to an elevation intermediate the doorway base sill and the subjacent substrate. For such prior art structures intended for motor vehicles, the step assembly in the stowed upper-station is usually beneath the vehicle itself and thereat exposed in inimical roadway contamination, debris, and water, whereby the step assembly is vulnerable to rust, corrossion, or physical damage.

It is accordingly the general object of the present invention to provide a readily installable step assembly suitable for reliably lowering the step-on tread to an appropriate lower-station and having an interim storage upper-station wherein the entire assembly is safely protected from contaminants external to the doorway framework. It is a related and ancillary general objective to provide a lowerable step assembly which is especially advantageously employable with door closures for roadway motor vehicles and especially desireable for the door of a truck vehicle operator's cab.

With the above and other objectives in view, which will become more apparent as this description proceeds, the novel lowerable step assembly of the present invention is adapted for ready installation and wholly restricted to the door itself at its internal side and generally comprises: a sturdy step-on tread pivotably associated with the lower portion of a vertical rail guided by a track means aptly mounted to the lower area of the door interior side, handle means whereby the rail and tread might be made to ascend from operative lower-station to an upper-station stored alongside the door interior above its bottom-edge, releaseable holding means for maintaining the rail and tread at upper-station until released whereby operative lower-station is gravitationally attained, upper-stop means for determining the tread elevation at lower-station, automatic pivot control means whereby the step-on tread changes from horizontal to vertical condition from lower-station to upper-station, and highly desireable permitted combinations of the aforesaid elements.

In the drawing, wherein like characters refer to like parts in the several views, and in which:

FIG. 1 is a perspective view of an apt hinged door environment for the lowerable step assembly concept of the present invention, specifically shown as the external side of an opened door for a motor vehicle operator's cab and the rearward side of the installed step assembly at lower-station;

FIG. 2 is a sectional elevational view taken along lines 1, 3, and 4, thus also being a side elevational view of a representative embodiment of the lowerable step-assembly;

FIG. 3 is a forward elevational view of the lowerable step assembly and taken along lines 3—3 of FIGS. 2 and 4;

Figure 6:
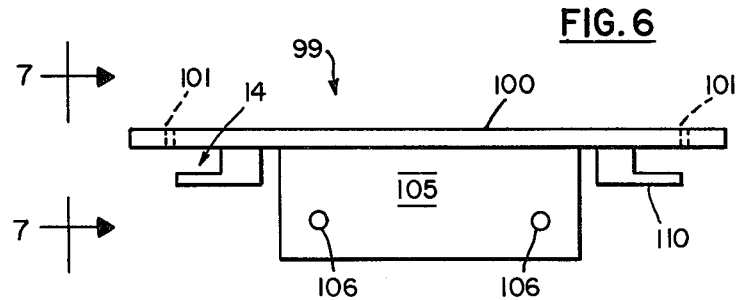
FIG. 6 is a top plan view of the FIG. 5 component.

An apt door and doorway framework environment for the lowerable step assembly "A" is shown in FIG. 1 confined to the hinged door "D" for a doorway "W" of motor vehicle truck "M". The ground substrate "G" is located some distance below the doorway base sill "WB" which is co-elevational with door bottom-edge "DB". Peripheral portions of door "D" in addition to bottom-edge "DB" are top-edge "DT", upright free-edge "DF", and upright hinged-edge "DH" with pivotal hinge locations "H". Door "D" comprises two upright planar parallel panels including interior panel "PI" and exterior panel "PE", inter-panels spacers "BS", "HS", and "FS", and transparent window "N". Intermediate in elevation between doorway base sill "WB" and roadway substrate "G" is the temporarily lower-stationed tread 30 ready for passenger use while the door "D" is in open condition.

Lowerable step assembly embodiment "A" as shown in FIGS. 1–4 comprises a pair of parallel vertical rails 20 maintained at fixed lateral-spacing "LS" and slidably guided by separate track means 10 which are attached to door "D" with bolts mounting means 19, step-on tread 30 being pivotal, attached with horizontal pivot-pins 29 to lower parts of rails 20. In FIGS. 1–4, solid line indicates the step assembly "A" at operative lower-station with step on plate 31 horizontal, while phantom line indicates the stowed upper-station wherein step-on plate 31 is parallel to door vertical interior panel "PI" and wholly above door bottom-edge "DB".

Each of the two respective vertically extending track means 10 of FIGS. 1–4 are of uniform C-shaped horizontal cross-sectional size and shape throughout the track-height 16–17. Each track 10 comprises a rear-wing 11 laterally extending parallel along the door interior panel "PI", and also comprises a laterally extending front-wing 13 spaced a finite-gap 14 transversely forwardly of rear-wing 11 by intervening web 12. Rear-wing 11, which is laterally lengthier than is front-wing 13, is securely mounted to door "D" as by means of bolts 19 which pass through removable interior panel "PI" but not through exterior panel "PE". Each track 10 has a top-end 16 and a bottom-end 17 defining the track-height which is preferably equal for both C-shaped tracks. In the mounted condition, the tracks 10 are located nearer the door "D" bottom-edge "DB" than to top-edge "DT", and herein the respective bottom-ends 17 are co-elevational substantially at door bottom-edge "DB". It is seen that tracks 10 are mounted so as to be confined within that lateral region between door free-edge "DF" and hinged-edge "DH". Moreover, it will be seen that the entire step assembly e.g. "A", is completely disconnected from the doorway framework e.g. motor vehicle "M", except secondarily through the door inherent hinged connection thereto e.g. "H".

Figure 4:
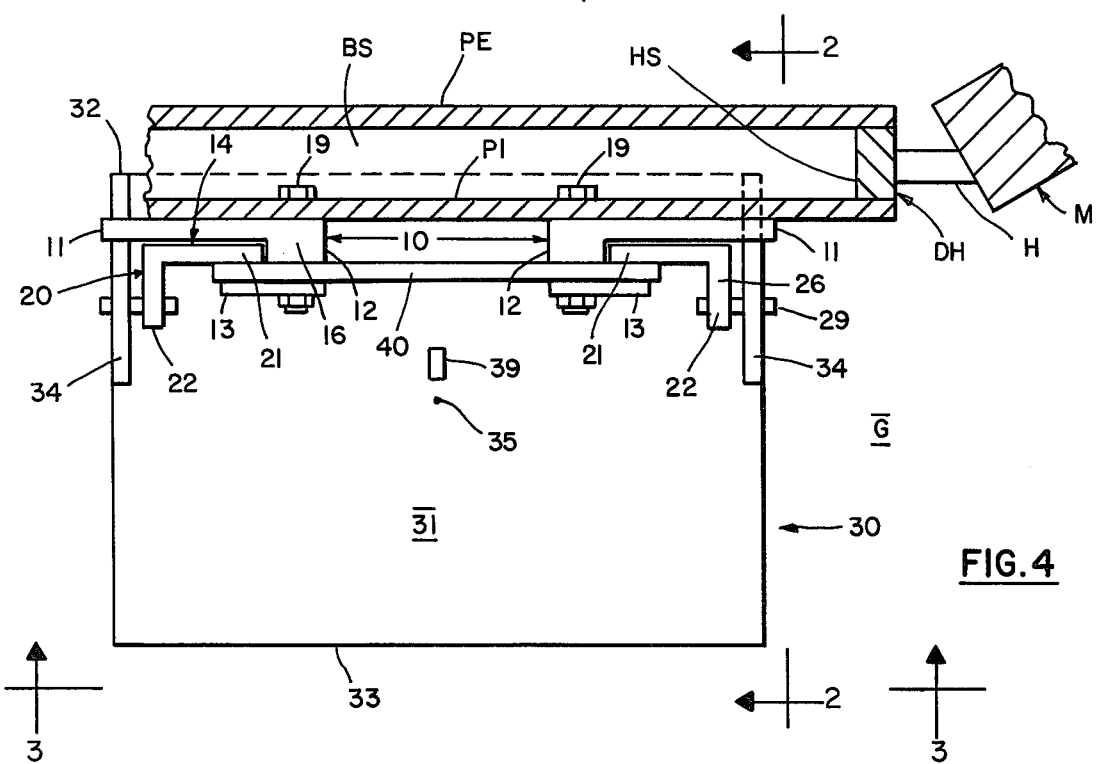
FIG. 4 is a top plan view taken along lines 4—4 of FIGS. 1-3.

The two vertical rails 20 for the respective track means 10 are shown of uniform angle-iron horizontal cross-sectional size and shape, best seen in FIG. 4. The lateral-wing 21 of angle-iron rail 20 is slidably associated and vertically guided within track finite-gap 14, the rail transverse-wing being indicated as 22. Rail 20 has an upper-end 26 and a lower-end 27, and when two rails are employed, their respective upper-ends 26 and lower-ends 27 are maintained co-elevational as by lateral-bar 40. Each rail 20 has an upperstop means to determine the elevation of rail 20 and tread 30 at assembly lower-station. For example, the upperstop means might comprise a horizontal lateral-bar 40 securely attached to co-elevational locations of rails 20 such as by welding to the respective lateral-wings 21 immediately below upper-ends 26. Thus, the lateral-bar upperstop 40 downwardly abutting against the tracks co-elevational top-ends 16 might determine the rails' 20 lower-station. It is seen that each of the rails 20 has an uninterrupted slidable-extent (within the respective tracks) extending downwardly from the upper-stop means eg. from lateral-bar 40 to rail lower-end 27, and which slidable-extent exceeds the track-height 16-17 by a factor of at least two. Such slidable-extent, indicated by the solid and phantom line conditions for lateral-bar 40, determines the difference in elevations for the step assembly at lower-station and at upper-station, respectively.

There are handle means attached to upper portions of the respective rails whereby the step assembly operator might cause manual raising of the tread 30 from lower-station to upper-station. Herein, the lateral-bar 40 might additionally function as a handle means and to also braceably rigidly maintain the lateral-extent "LS" parallelism between the two rails 20.

Step-on tread 30 shown comprises a planar sturdy base plate 31 onto which the operator might emplant his foot when making ingress to or egress from the doorway base sill e.g. "WB". For the two rails situation, tread 30 is pivotably attached to the lower portions of the respective rails 20 immediately above lower-ends 27 with laterally extending horizontal pivot-pins 29. Herein, the tread 30 is formed of a single piece of permanently bent sturdy metal including both the planar step-on plate 31 (having lateral rear-edge 32 and lateral front-edge 33) and two bent-up transversely extending lips 34 through which lateral pivot-pins 29 pass. The center-of-mass for tread 30 is indicated as 35. As best seen in FIG. 4, the pivot-pins 29 are located between the tread center-of-mass 35 and the rear-edge 32, which ensures that the step-on base plate 31 automatically assumes an operative horizontal condition and upwardly abutting the rail lower-end when the rails are allowed to gravitationally descend to lower-station.

There are automatic pivot control means to cause the step-on plate 31 to automatically pivot from horizontal to vertical positions as the handle means (40) causes the rails to ascend from lower-station to upper-station. As clearly indicated in FIGS. 1-4, one such automatic pivot control means comprises the plate lateral rear-edge 32 being located between the door panels "PI" and "PE" and the up-bent lip 34 being in alignment below the track rear-wing 11 when the tread 30 is at lower-station. As the rails 20 are manually raised, the rearward portions e.g. 32, of step-on plate 31 upwardly abut the door "D" bottom-edge "DB" and the tread lips 34 upwardly abut the rear-wings 11 causing plate front-edge 33 to pivot upwardly about pivot-pins 29. Another type automatic pivot control means might include an upwardly motivatable cable (not shown) having the cable lower extremity tied to tread 30, as through an eyelet 39 attached to and herein extending upwardly of step-on plate 31.

There are releaseable holding means located loftily above the door bottom-edge "DB" for maintaining the rails 20 and tread 30 at upper-station, and which when released by the operator allows them to descend gravitationally to lower-station. One example of such releaseable holding means comprises a latch mechanism 50 attached to the door interior panel "PI" above the track means, and conventionally including a prong 51 extending normally-outward (as by counterbalance or spring means) toward and through an upper aperture 23 for a rail 20. A push-button 55 might conventionally withdraw prong 51 from aperture 23 whereupon the rail 20 and pivotably associated tread 30 gravitationally descend to lower-station.

Figures 5, 7:
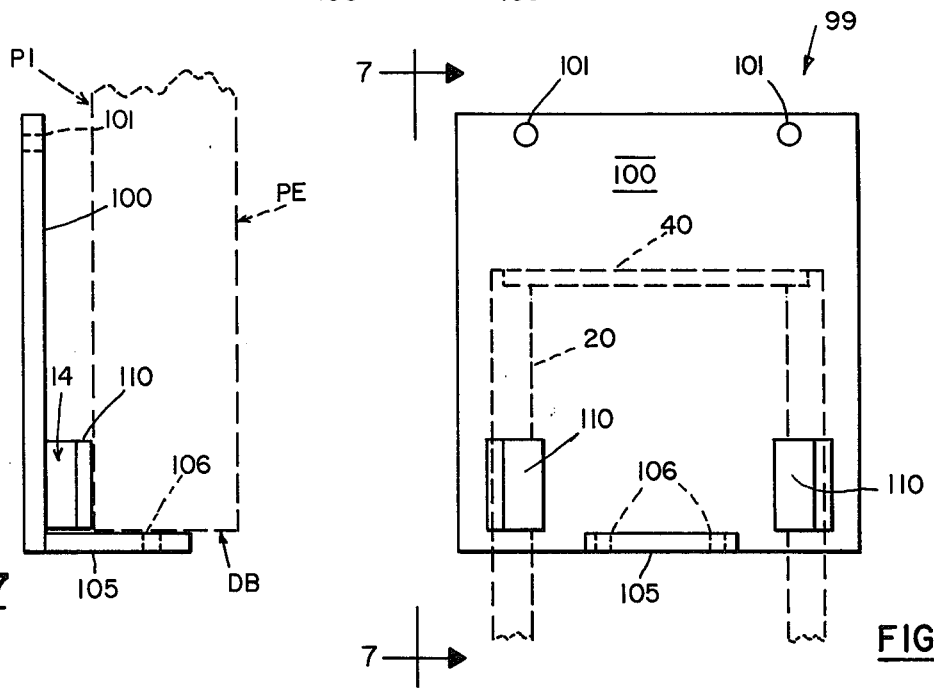
FIG. 5 is a rearward elevational view of an alternate embodiment mountable track means component of the present invention.
FIG. 7 is a side elevational view of the FIG. 5 component taken along lines 7—7 of FIGS. 5 and 6.

It is seen in FIGS. 2-4 that the bolts 19 mounting means for the tracks 10 necessitates laborious temporary removal of interior panel "PI" from door "D". Moreover, the passage of bolts 19 through interior panel "PI" leaves permanent holes which mar the appearance if the step assembly "A" is later removed, as during vehicle "M" re-sale, etc. Turning now to FIGS. 5-7, there is disclosed a novel component 99 which has several advantages over analagous separate components 10 and 19.

Component 99 is of generally L-shaped shape as seen in FIG. 7 side elevation including a vertical face-plate portion 100 for positioning outwardly parallel to door internal panel "PI". Component 99 also includes a horizontal foot portion 105 for abutment upwardly against and attachment to the door bottom-edge horizontal member "BS" utilizing vertical fasteners (not shown) passing upwardly through foot apertures 106. Face-plate portion 100 has apertures 101 whereby appropriate mounting to the door "D" might be accomplished, and even at door upright side members "HS" and "FS" utilizing separate intervening cross-members (not shown) themselves attached at face-plate apertures 101. Thus, it is apparent that face-plate 100 makes possible the aesthetic obscurement of the track means (10, 110) and makes possible track means mounting to a door "D" without damage to the interior panel "PI". Moreover, from a single sheet of metallic structural material appropriately bent and cut, the component 99 might economically and aesthetically provide integral track means 110 (for rails 20) in addition to the face-plate 100 and foot 105 portions.

From the foregoing, the construction and operation of the lowerable step assembly will be readily understood and further explanation is believed to be unnecessary. However, since numerous modifications and changes will readily occur to those skilled in the art, it is not desired to limit the invention to the exact construction shown and described, and accordingly, all suitable and apt modifications and equivalents may be resorted to, falling within the scope of the appended claims.

I claim:

1. In physical combination with the interior side of a hingedly attached vertical door having a top-edge and a bottom-edge, a lowerable step assembly having a step-on tread pivotably connected to the lower portion of at least one vertical rail slidably engaged with track means therefor, said step assembly being completely disconnected from the doorway framework except secondarily through the door inherent hinged connection thereto, said step assembly having an operative lower-station wherein the step-on tread is horizontal and located well below the opened door bottom-edge and whereat an upperstop means from the rail downwardly abuts the track means, said step assembly having a stowed upper-station wherein the tread is vertical and parallel to the closed door and located wholly above the door bottom-edge, wherein A. said track means comprises at least one vertical track lying alongside and parallel to the door vertical interior side, said track having a track-height from the track top-end to bottom-end;

B. mounting means for attaching said at least one track to the door nearer the bottom-edge than to the top-edge;

C. said at least one vertical rail slidably engaged with and vertically guided by said vertical track, said rail extending downwardly from said upperstop means having an uninterrupted slidable-extent exceeding the track-height by a ratio of at least two and which rail slidable-extent determines the step assembly tread elevation at said lower-station;

D. handle means connected to said rail whereby the assembly operator might manually initiate the said at least one rail and pivotably associated tread to ascend from lower-station to upper-station;

E. Releaseable holding means located loftily above the door bottom-edge to maintain the rail and tread at upper-station and which when released allows the rail and tread to descend gravitationally to lower-station; and F. automatic pivot control means to cause the step-on tread to automatically pivot from horizontal to vertical as the at least one rail is caused to ascend from lower-station to upper-station.

2. The step assembly of claim 1 wherein there is a pair of parallel tracks attached at co-elevation to the door; wherein there are slidable rails at fixed lateral-spacing for the two track means; and wherein there is a horizontal lateral-bar connecting upper portions of the two rails to provide said upper-stop means, said handle means, and for rigidly maintaining the lateral-spacing extent between the two rails.

3. The step assembly of claim 2 wherein the automatic pivot control means comprises transverse lips extending upwardly from the tread step-on plate portion and which lips are adapted to upwardly abut said track rearwardly of its slidably associated rail as the step assembly is caused to ascend by the handle means from lower-station toward upper-station.

4. The step assembly of claim 2 wherein the automatic pivot control means includes a cable attachment means attached to the step-on tread forwardly of its pivotal connection to the rails.

5. The step assembly of claim 2 wherein the respective track means are of generally C-shaped cross-section with the top-ends and the bottom-ends being of co-elevation; wherein the two rails have co-elevational lower-ends which abut rearward portions of the tread at said lower-station; and wherein the center-of-mass for the tread is located forwardly of its pivotal connections to the rails.

6. The step assembly of claim 5 wherein said rails are of angle iron cross-sectional shape; and wherein the track rear-wing is laterally lengthier than the front-wing to abut the tread lips.

7. The step assembly of claim 2 wherein the tread at lower-station is located medially the vehicle door bottom-edge and the motor vehicle underlying substrate, said step assembly being wholly laterally restricted between the door hinged-edge and free-edge; and wherein the releaseable holding means includes a prong for removable engagement with an aperture in a rail upper portion.

8. The step assembly of claim 1 wherein the mounting means comprises an L-shaped component including a vertical face-plate to which the at least one track means is rearwardly positioned and attached, said face-plate being attachable to the door and coincidentally aesthetically obscuring the track means, said L-shaped component also including a horizontal foot portion abuttably attachable upwardly against the door bottom-edge.

9. The step assembly of claim 8 wherein there is a pair of parallel track means attached at fixed lateral-spacing and at co-elevation to the face-plate; and wherein the face-plate and foot portions are respectively apertured to permit apt mounting at the door interior side.

10. The step assembly of claim 1 wherein the door is on a motor vehicle, said step assembly being confined to the lateral confines of the door between hinged-edge and free-edge.

* * * * *